Feb. 8, 1944.    R. J. KOPP    2,341,048
AUTOMOBILE LICENSE STAMP HOLDER
Filed Feb. 10, 1942
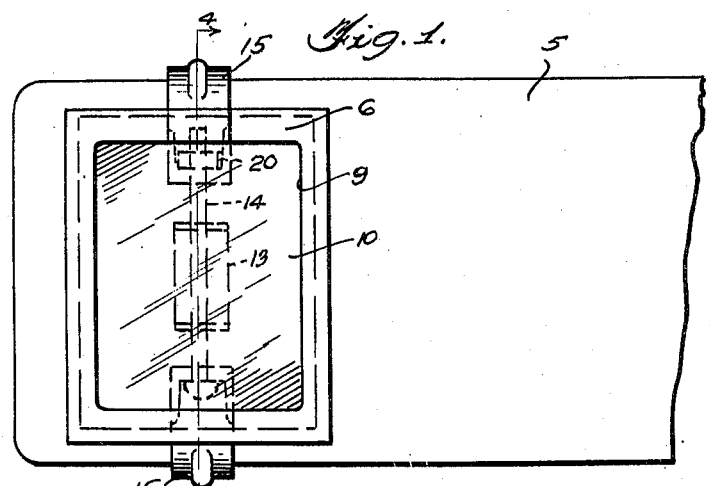
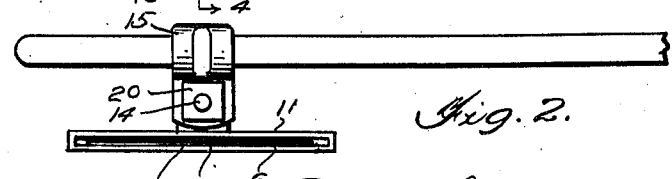
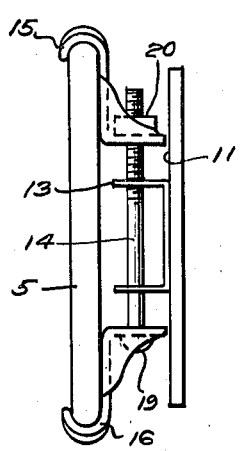
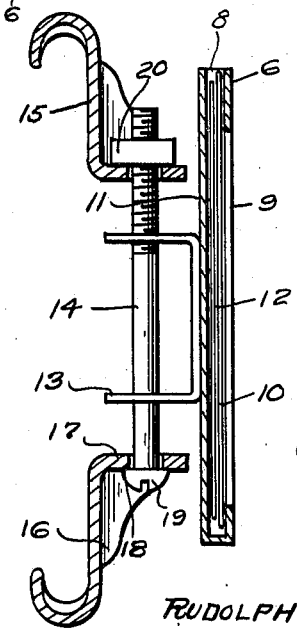
Inventor
RUDOLPH J. KOPP
By Clarence A. O'Brien
and Harvey B. Jacobson
Attorneys Patented Feb. 8, 1944

2,341,048

UNITED STATES PATENT OFFICE 2,341,048

AUTOMOBILE LICENSE STAMP HOLDER

Rudolph J. Kopp, Sandusky, Ohio

Application February 10, 1942, Serial No. 430,264

2 Claims. (Cl. 248—226)

The present invention relates to new and useful improvements in holders adapted for containing an automobile license stamp, identification card, or the like, and has for its primary object to provide a device of this character embodying clamping means adapted for clamping the stamp or card holder to a conventional rear view mirror.

A further object of the invention is to provide a device of this character adapted for easily and quickly securing the stamp holder in position to the rear view mirror and which, at the same time, does not interfere with the normal use of the mirror and in which the stamp holder embodies a simple and practical construction, which is neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a fragmentary rear elevational view of a rear view mirror showing the stamp holder in position thereon.

Figure 2 is a top plan view.

Figure 3 is an edge elevational view, and

Figure 4 is a vertical sectional view taken substantially on a line 4—4 of Figure 1.

Referring now to the drawing in detail, wherein for the purpose of illustration I have disclosed a preferred embodiment of the invention, the numeral 5 designates a conventional form of rear view mirror of a type generally attached to the inside of an automobile and to which is attached a stamp or card holder designated generally at 6.

The stamp holder is designed primarily for use in holding the tax stamp now required for automobiles and other vehicles and the holder comprises a flat container 7 having its upper edge open, as indicated at 8, and also provided in one wall with a window opening 9 by means of which the stamp or card 10 may be viewed, the stamp being inserted through the opening 8 in the top of the container.

To the rear wall 11 of the container is soldered, or otherwise secured, the bight portion 12 of a U-shaped bracket 13 having a bolt 14 inserted through its leg portions, the bolt being freely inserted through one of the legs of the bracket and threaded through the other leg of the bracket so that the bracket will be maintained in a predetermined position on the bolt.

Upper and lower clamping members 15 and 16 are mounted on the bolt, the clamping members including horizontal flanges 17 having openings 18 therein through which the bolt is freely inserted. The lower flange 17 is engaged by the head 19 of the bolt, while the upper flange of the clamp 15 is engaged by the nut 20 threaded on the upper end of the bolt to clamp the members 15 and 16 on the upper and lower edges respectively of the mirror 5, as indicated in Figures 1 and 3 of the drawing.

The device is preferably secured in position to the rear side of the mirror 5 so as not to interfere with the normal use of the mirror and also in order that the stamp or card 10 may be observed through the windshield of the automobile.

It is believed the details of construction, advantages and manner of use of the device will be readily understood from the foregoing without further detailed explanation.

Having thus described the invention what I claim is:

1. A clamping device comprising a pair of clamping jaws, a bolt freely inserted through the jaws, said bolt having means at each end for retaining the jaws thereon, and a bracket member carried by the bolt and engaged by the threads of the bolt for retaining the bracket in a predetermined position on the bolt between said jaws.

2. Attaching means for a flat container comprising a rigid U-shaped bracket having its bight portion secured to the rear of said container and with the legs of said bracket projecting rearwardly therefrom in vertically spaced relation, a bolt threadedly engaged with said legs, and having a nut at one end and a head at its other end, and a pair of clamping members freely mounted on the bolt and retained in cooperating clamping relation on the ends of the bolt by said nut and head.

RUDOLPH J. KOPP.